(12) United States Patent
Lin

(10) Patent No.: US 9,967,519 B1
(45) Date of Patent: May 8, 2018

(54) VIDEO CONFERENCE CONTROL METHOD AND APPARATUS USING THE SAME

(71) Applicant: NANNING FUGUI PRECISION INDUSTRIAL CO., LTD., Nanning (CN)

(72) Inventor: Jui-Chin Lin, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days. days.

(21) Appl. No.: 15/636,761

(22) Filed: Jun. 29, 2017

(30) Foreign Application Priority Data

Mar. 31, 2017 (TW) ............... 106111159 A

(51) Int. Cl.
*H04N 7/15* (2006.01)
*H04N 7/14* (2006.01)
*G10L 15/22* (2006.01)
*G06F 3/03* (2006.01)
*H04M 3/42* (2006.01)

(52) U.S. Cl.
CPC .......... *H04N 7/147* (2013.01); *G06F 3/0304* (2013.01); *G10L 15/22* (2013.01); *H04M 3/42* (2013.01); *H04N 7/142* (2013.01); *H04M 2203/251* (2013.01)

(58) Field of Classification Search
CPC combination set(s) only.
See application file for complete search history.

(56) References Cited

U.S. PATENT DOCUMENTS

| 2011/0285808 | A1* | 11/2011 | Feng | H04N 7/142 348/14.09 |
|---|---|---|---|---|
| 2013/0201345 | A1 | 8/2013 | Ling | |
| 2016/0351066 | A1* | 12/2016 | Osemlak | G09B 15/00 |
| 2017/0026763 | A1* | 1/2017 | Pratt | H04N 5/23296 |
| 2017/0070668 | A1* | 3/2017 | Bohac | H04N 5/23219 |

FOREIGN PATENT DOCUMENTS

| CN | 102256098 A | 11/2011 |
|---|---|---|
| CN | 102625077 A | 8/2012 |
| CN | 103051838 | 4/2013 |
| CN | 104580992 | 4/2015 |
| WO | 2015/085949 | 6/2015 |

* cited by examiner

*Primary Examiner* — Joseph J Nguyen
(74) *Attorney, Agent, or Firm* — ScienBiziP, P.C.

(57) ABSTRACT

A video conference control method operable to be executed in a video conference control apparatus. A request to speak from a mobile terminal on or near to a person or other source of speech is received. The mobile terminal is controlled to make a preset sound according to the request to speak. The preset sound is received and recognized. The position of the mobile terminal is determined according to the preset sound using a preset sound positioning method. A monitoring lens is controlled to align with the mobile terminal, and the sound source is displayed for the benefit of other conference attendees.

12 Claims, 3 Drawing Sheets

VIDEO CONFERENCE CONTROL METHOD AND APPARATUS USING THE SAME

FIELD

The subject matter herein generally relates to video conferencing.

BACKGROUND

Video monitoring technologies are widely used, in home security and video conferencing. In order to meet people's needs, video conferencing requires smart steering of monitoring camera lenses and clearer shooting of a picture. However, in existing video conferencing systems, zoom magnification of the monitoring camera lenses cannot be automatically adjusted for different persons, while a controlling mode for the lens steering is not adapted to deaf-mute sign language and to device display.

BRIEF DESCRIPTION OF THE DRAWINGS

Implementations of the present technology will be described, by way of example only, with reference to the attached figures.

DETAILED DESCRIPTION

Figure 1:
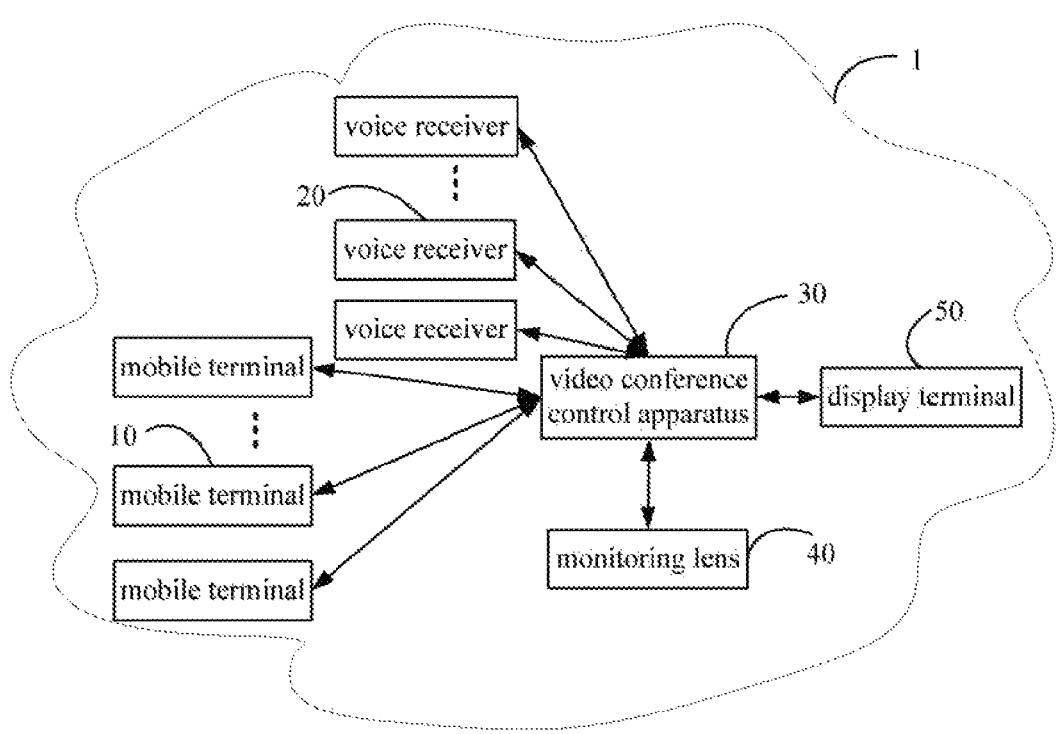
FIG. 1 is an exemplary embodiment of a structure of a video conference system.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts have been exaggerated to better illustrate details and features of the present disclosure.

It should be noted that references to "an" or "one" exemplary embodiment in this disclosure are not necessarily to the same exemplary embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when used, means "including, but not necessarily limited to"; it specifically indicates open-ended inclusion or membership in a so-described combination, group, series, and the like.

FIG. 1 illustrates an exemplary embodiment of a structure of a video conference system 1. The video conference system 1 comprises a mobile terminal 10, a voice receiver 20, a video conference control apparatus 30, a monitoring lens 40, and a display terminal 50. The video conference control apparatus 30 connects with the monitoring lens 40, the display terminal 50, and the voice receiver 20, by wired or wireless means. The video conference control apparatus 30 connects with the mobile terminal 10, for example, by wireless means. The mobile terminal 10 may be a mobile phone, a tablet computer, a wearable device, or the like. The video conference control apparatus 30 may be a network device or a server for controlling and managing the mobile terminal 10, the voice receiver 20, the monitoring lens 40, and the display terminal 50.

Figure 2:
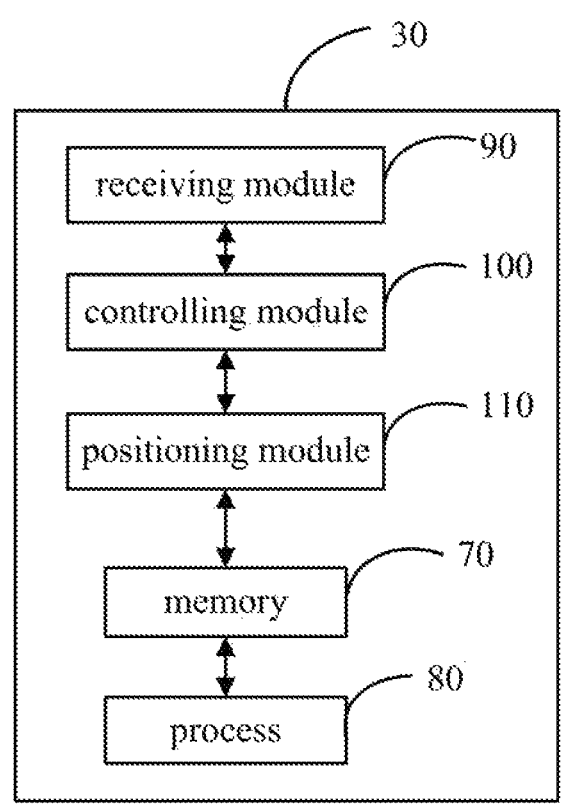
FIG. 2 is a block diagram of an exemplary embodiment of functional modules of a video conference control apparatus.

FIG. 2 is a block diagram of an exemplary embodiment of functional modules of a video conference control apparatus.

The video conference control apparatus 30 includes a receiving module 90, a controlling module 100, a positioning module 110, a memory 70, and one or more processors 80. The functions of each of the modules 90-110 are executed by the one or more processors 80. Each module of the present disclosure is a computer program or segment of a program for completing a specific function. A memory 70 stores the program code and other information of the video conference control apparatus 30.

The receiving module 90 receives speaker information about the person who is speaking from the mobile terminal 10. The speaker information may indicate a specific person, wherein the person is a deaf person who can only communicate in sign language. The speaker information may also be a device, such as a display screen showing a video stream of a person. When the speaker is a person, the speaker information may also comprise size information, which can include height of the person. When the speaker is the device, the size information can include attributes of the device, such as length, width, and height. In the present embodiment, the mobile terminal 10 provides an interface for a user to register their presence, by key input for example. In another embodiment, when the speaker is a device, the mobile terminal can further register relative position information between the device and the mobile terminal 10. The relative position information includes a distance and an orientation. The receiving module 90 also receives an index registered in respect of the mobile terminal 10, such as a user name or a code.

The receiving module 90 receives a request to speak from the mobile terminal 10. In the present embodiment, the request to speak is input into the mobile terminal 10 by the user through a key, and is transmitted by the mobile terminal 10 to the video conference control apparatus 30.

In another embodiment, the request to speak also can be generated by receiving and recognizing a request to speak voice of a user from the voice receiver 20, and be sent to the video conference control apparatus 30. The request to speak voice includes the registration index of the mobile terminal 10. The registration index includes the user name or the code.

The controlling module 100 controls the mobile terminal 10 to make a preset sound according to the request to speak. In the present embodiment, the preset sound can be preset to different categories for different mobile terminals 10. For example, when a video conference system includes a first mobile terminal and a second mobile terminal, the controlling module 100 can preset a sound of the first mobile terminal as "tinkling", and a sound of the second mobile terminal as "rub-a-dub". Setting different sounds is convenient for voice recognition. The preset sound is received by the voice receiver 20, and then is transmitted to the video conference control apparatus 30.

The positioning module 110 receives and recognizes the preset sound, and determines position of the mobile terminal 10 according to the preset sound, using a preset sound positioning method. The sound positioning method is an existing method for determining sound source by a plurality of voice receivers. In the present embodiment, the sound positioning method is also applicable to deaf or mute person as speaker, for sign language or device display, since the positioning method is performed based on the preset sound issued by the mobile terminal 10, and the speaker is not required to make a sound.

After the position of the mobile terminal 10 is determined, the controlling module 100 controls the monitoring lens 40 to align with the mobile terminal 10 according to the position of the mobile terminal 10. After the monitoring lens 40 aligns with the mobile terminal 10, the controlling module 100 adjusts zoom magnification of the monitor lens 40 according to the speaker size information and a preset correspondence relationship between a speaker size and the zoom magnification. When the the speaker is an device, the controlling module 100 controls the monitoring lens 40 to align with the device according to the relative position information and the position of the mobile terminal 10.

In another embodiment, when a plurality of speakers request to speak at the same time (that is, the receiving module 90 receives a plurality of requests to speak at the same time), the controlling module 100 calculates second position information corresponding to the speakers, wherein the second position information is calculated according to first position information of the mobile terminals 10 and a preset position calculation rule. The preset position calculation rule can be considered to calculate a center position of a plurality of positions corresponding to first position information of the mobile terminals.

At the same time, the controlling module 100 calculates a second size according to a preset size calculation rule and first size information. The preset size calculation rule can be considered to calculate the maximum size of the mobile terminals 10 according to a plurality of sizes.

Then, the controlling module 100 controls the monitoring lens 40 to align with a second position corresponding to the second position information. The controlling module 100 adjusts the zoom magnification of the monitor lens 40 according to the second size and the correspondence relationship between the preset size information and the zoom magnification. The directional adjustment of the monitor lens 40 and the zoom magnification can be dynamically changed according to the number of the speakers, to capture picture of the speakers with a better view ratio.

Finally, the controlling module 100 can control the display terminal 50 to show such picture captured by the monitor lens 40.

Figure 3:
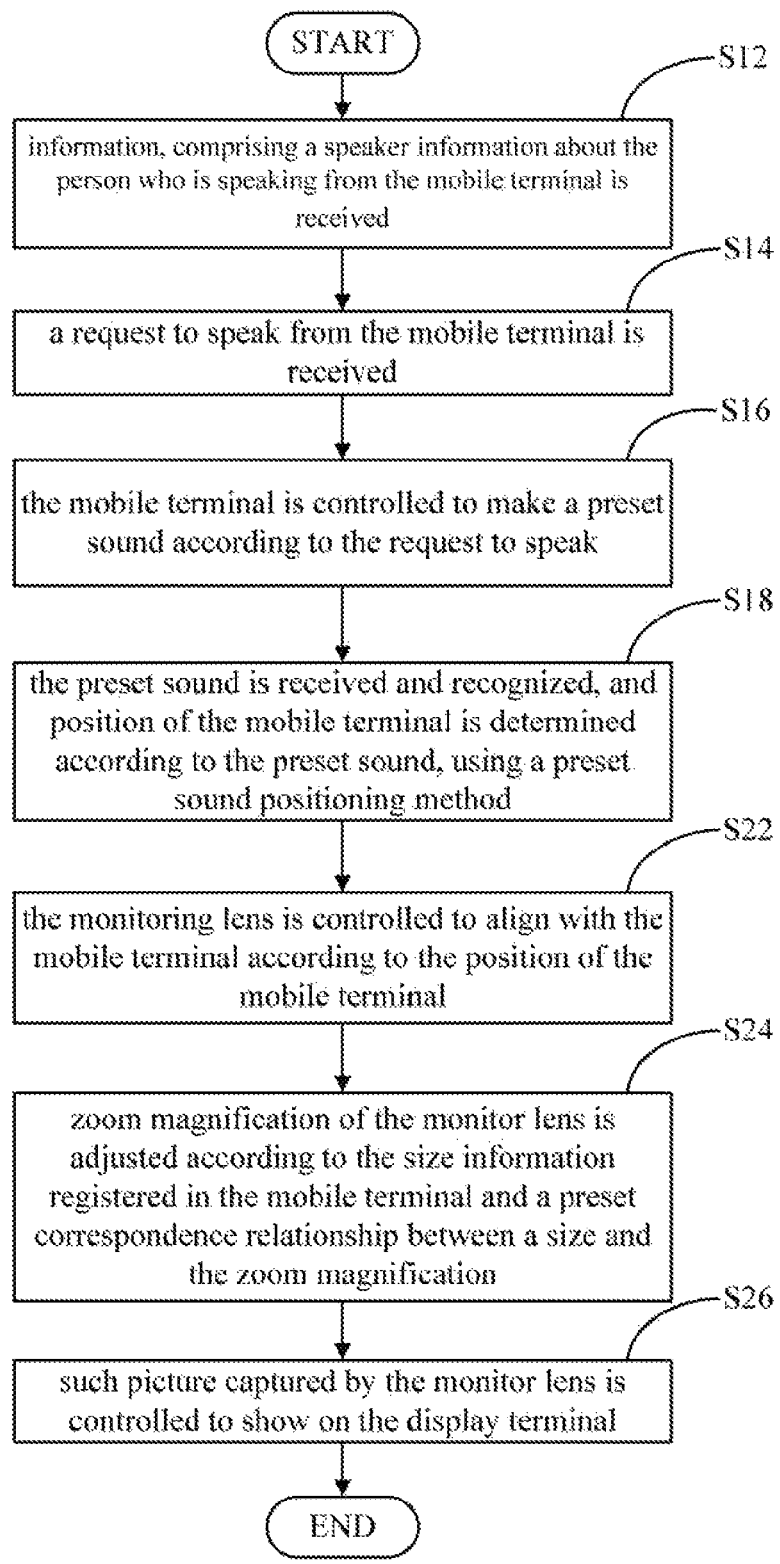
FIG. 3 is a flowchart of an exemplary embodiment of a video conference control method.

FIG. 3 is a flowchart of an exemplary embodiment of a video conference control method. The video conference control method operable to be executed in a video conference control apparatus. The video conference control method is implemented through a processor executes a program code stored in memory. The video conference control apparatus is applied in a video conference system comprising a mobile terminal, a monitoring lens, a voice receiver, and a display terminal.

At block 12, information, comprising a speaker information about the person who is speaking from the mobile terminal is received. The speaker information may indicate a specific person, wherein the person is a deaf person who can only communicate in sign language. The speaker information may also be a device, such as a display screen showing a video stream of a person. When the speaker is a person, the speaker information may also comprise size information, which can include height of the person. When the speaker is the device, the size information can include attributes of the device, such as length, width, and height. In the present embodiment, the mobile terminal 10 provides an interface for a user to register their presence, by key input for example. In another embodiment, when the speaker is a device, the mobile terminal can further register relative position information between the device and the mobile terminal 10. The information further comprises an index of the mobile terminal, such as, a user name or a code.

At block 14, a request to speak from the mobile terminal is received. In the present embodiment, the request to speak is input into the mobile terminal by the user through a key, and is transmitted to the video conference control apparatus. In other embodiment, the request to speak also can be generated by receiving and recognizing a request to speak of a user from the voice receiver. The request to speak voice includes the registration index of the mobile terminal, and the registration index includes the user name or the code.

At block 16, the mobile terminal is controlled to make a preset sound according to the request to speak. The preset sound can be preset to different categories for different mobile terminals. For example, when a video conference system includes a first mobile terminal and a second mobile terminal, a sound of the first mobile terminal can be preset as "tinkling", and a sound of the second mobile terminal can be preset as "rub-a-dub". Setting different sounds is convenient for voice recognition. The preset sound is received by the voice receiver, and then is transmitted to the video conference control apparatus.

At block 18, the preset sound is received and recognized, and position of the mobile terminal is determined according to the preset sound, using a preset sound positioning method. In the present embodiment, the sound positioning method is an existing method for determining sound source by a plurality of voice receivers.

At block 22, the monitoring lens is controlled to align with the mobile terminal according to the position of the mobile terminal. When the the speaker is a device, the monitoring lens is controlled to align with the device according to the relative position information and the position of the mobile terminal.

At block 24, zoom magnification of the monitor lens is adjusted according to the size information registered in the mobile terminal and a preset correspondence relationship between a size and the zoom magnification. In the present embodiment, a correspondence relationship between the size and the zoom magnification is preset. After the monitor lens aligns with the mobile terminal, the zoom magnification of the monitor lens can be adjusted according to the size information registered in the mobile terminal and the correspondence relationship between the speaker size and the zoom magnification. In this way, the monitor lens can accurately and clearly capture picture of the mobile terminal.

When a plurality of speakers request to speak at the same time (that is, a plurality of request is received to speak at the same time at the block 14), second position information corresponding to the speakers is calculated at the block 22, wherein the second position information is calculated according to first position information of the mobile terminals at the block 18 and a preset position calculation rule. The preset position calculation rule can calculate a center position of a plurality of positions corresponding to first position information of the mobile terminals. The block 24 calculates a second size according to a preset size calculation rule and first size information. The zoom magnification of the monitor lens is adjusted according to the new size and the correspondence relationship between preset size information and the zoom magnification at the block 24. The preset size calculation rule can be considered to calculate the maximum size of the mobile terminals according to a plurality of sizes.

At block 26, such picture captured by the monitor lens is controlled to show on the display terminal.

It should be emphasized that the above-described exemplary embodiments of the present disclosure, including any particular exemplary embodiments, are merely possible examples of implementations, set forth for a clear understanding of the principles of the disclosure. Many variations and modifications can be made to the above-described exemplary embodiment(s) of the disclosure without departing substantially from the spirit and principles of the disclosure. All such modifications and variations are intended to be included herein within the scope of this disclosure and protected by the following claims.

What is claimed is:

1. A video conference control apparatus, the apparatus comprising:
　at least one processor;
　a non-transitory storage system coupled to the at least one processor and configured to store one or more programs configured to be executed by the at least one processor, the one or more programs comprising instructions for:
　receiving a request to speak from a mobile terminal;
　controlling the mobile terminal to make a preset sound according to the request to speak;
　receiving and recognizing the preset sound;
　positioning the mobile terminal according to the preset sound using a preset sound positioning method;
　controlling a monitoring lens to align with the mobile terminal according to a position of the mobile terminal;
　when a plurality of requests to speak of mobile terminals are received, calculating a second size according to first size information and a preset size calculation rule of a maximum size of the mobile terminal; and
　adjusting zoom magnification of the monitoring lens according to the second size.

2. The video conference control apparatus as claimed in claim 1, wherein the one or more programs further comprise instructions for:
　receiving speaker information, comprising a specific person, a device or size information, wherein the speaker information is registered in the mobile terminal, and, when the speaker is the device, the mobile terminal further register relative position information between the device and the mobile terminal.

3. The video conference control apparatus as claimed in claim 2, the one or more programs further comprise instructions for:
　controlling the monitoring lens to align with the device according to the relative position information and the position of the mobile terminal.

4. The video conference control apparatus as claimed in claim 2, wherein the one or more programs further comprise instructions for:
　adjusting the zoom magnification of the monitoring lens, according to the information of the size and a correspondence relationship between a preset size and the zoom magnification, after the monitoring lens is aligned with the mobile terminal.

5. The video conference control apparatus as claimed in claim 1, the one or more programs further comprise instructions for:
　when a plurality of requests to speak from mobile terminals are received, calculating second position information according to first position information of the mobile terminals and a preset position calculation rule; and
　controlling the monitoring lens to align with a second position corresponding to the second position information.

6. The video conference control apparatus as claimed in claim 1, wherein the request to speak is generated by receiving and recognizing the request to speak voice of a user from the voice receiver.

7. A video conference control method operable to be executed in a video conference control apparatus, the method comprising:
　receiving a request to speak from a mobile terminal;
　controlling the mobile terminal to make a preset sound according to the request to speak;
　receiving and recognizing the preset sound;
　positioning the mobile terminal according to the preset sound using a preset sound positioning method;
　controlling a monitoring lens to align with the mobile terminal according to a position of the mobile terminal;
　when a plurality of requests to speak of mobile terminals are received, calculating a second size according to first size information and a preset size calculation rule of a maximum size of the mobile terminal; and
　adjusting zoom magnification of the monitoring lens according to the second size.

8. The video conference control method as claimed in claim 7, further comprising:
　receiving speaker information, comprising a specific speaker, a device and size information, wherein the speaker information is registered in the mobile terminal, and, when the speaker is the device, the mobile terminal further register relative position information between the device and the mobile terminal.

9. The video conference control method as claimed in claim 8, further comprising:
　controlling the monitoring lens to align with the device according to the relative position information and the position of the mobile terminal.

10. The video conference control method as claimed in claim 8, further comprising:
　adjusting the zoom magnification of the monitoring lens, according to the information of the size and a correspondence relationship between a preset size and the zoom magnification, after the monitoring lens is aligned with the mobile terminal.

11. The video conference control method as claimed in claim 7, further comprising:
　when a plurality of requests to speak from mobile terminals are received, calculating second position information according to first position information of the mobile terminals and a preset position calculation rule; and controlling the monitoring lens to align with a second position corresponding to the second position information.

12. The video conference control method as claimed in claim 7, wherein the request to speak is generated by receiving and recognizing the request to speak voice of a user from the voice receiver.

\* \* \* \* \*